United States Patent [19]

Seip

[11] 4,409,790
[45] Oct. 18, 1983

[54] MECHANICALLY CONTROLLED BRAKE BOOSTER

[75] Inventor: Hermann Seip, Bad Vilbel, Fed. Rep. of Germany

[73] Assignee: ITT Industries, Inc., New York, N.Y.

[21] Appl. No.: 238,797

[22] Filed: Feb. 27, 1981

[30] Foreign Application Priority Data

Mar. 31, 1980 [DE] Fed. Rep. of Germany ....... 3012454

[51] Int. Cl.³ .......................... B60T 13/00; F15B 9/10
[52] U.S. Cl. ................................ 60/547.1; 91/369 A; 91/376 R
[58] Field of Search ............. 91/369 R, 369 A, 369 B, 91/376 R; 60/547 R, 554; 92/130

[56] References Cited

U.S. PATENT DOCUMENTS 4,338,854  7/1982  Margetts ........................... 91/369 A

FOREIGN PATENT DOCUMENTS 2040376  8/1980  United Kingdom ............. 91/369 A
2053395  2/1981  United Kingdom ............. 91/369 A
2066395  7/1981  United Kingdom ............. 60/547 R Primary Examiner—Paul E. Maslousky
Assistant Examiner—Abram Mc. Bradley, IV
Attorney, Agent, or Firm—John T. O'Halloran; Alfred C. Hill

[57] ABSTRACT

To reduce the load or force exerted on the housing of a vacuum brake booster, the master cylinder housing extends axially through the booster housing thereby connecting the two end walls of the booster housing together. The master cylinder housing is directly attached to the splashboard of the vehicle. The movable wall of the booster sealingly surrounds the housing of the master cylinder and acts on the housing of the booster control valve via tie rods extending axially through the end wall of the booster housing adjacent the splashboard and connected to a yoke fixed to the adjacent end surface of the housing of the booster control valve.

15 Claims, 2 Drawing Figures

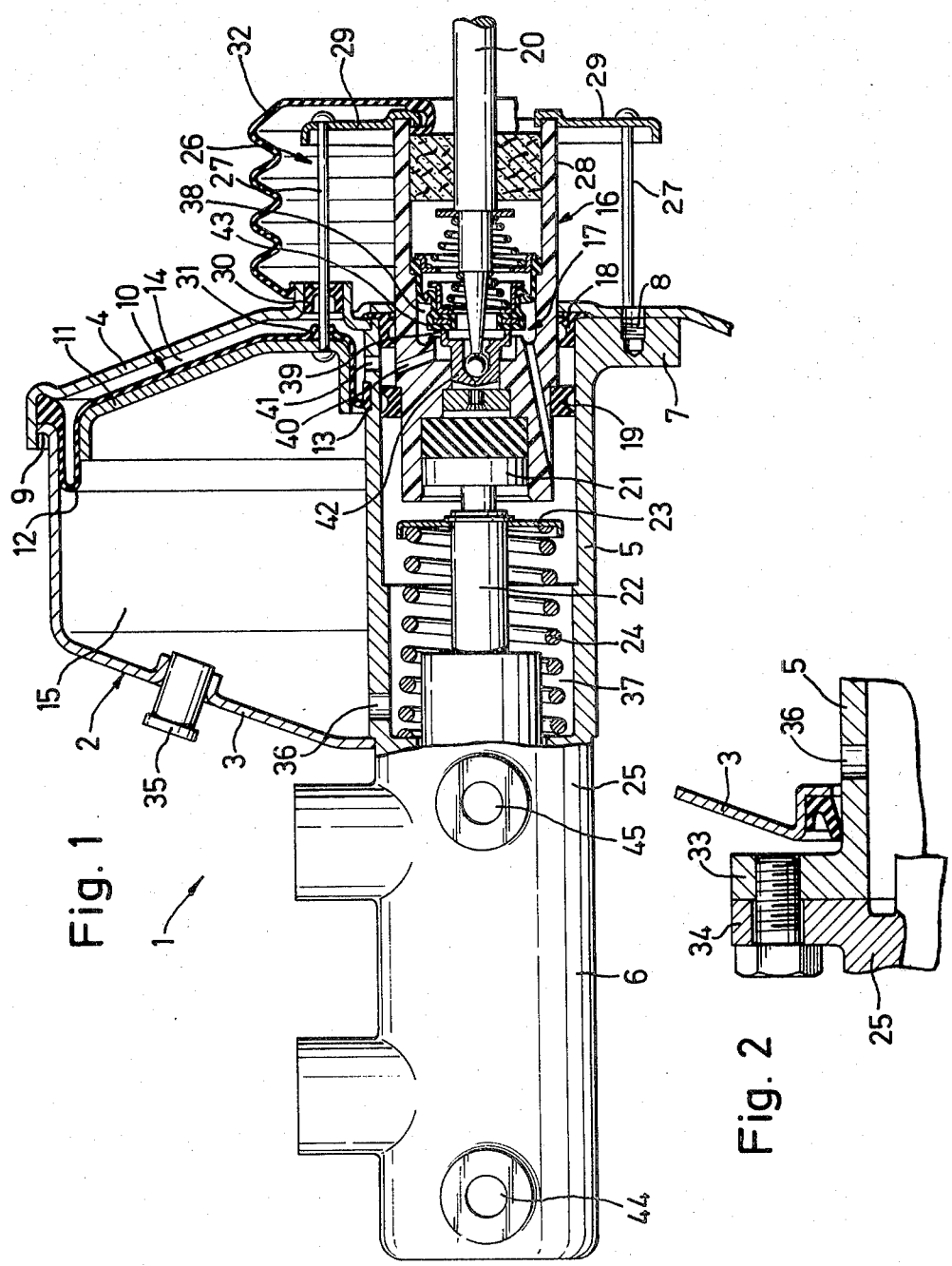

MECHANICALLY CONTROLLED BRAKE BOOSTER

BACKGROUND OF THE INVENTION

The present invention relates to a mechanically controlled brake booster, in particular, for automotive vehicles, utilizing the differential of pressure between a partial vacuum and atmospheric pressure and comprising basically a low-pressure casing with at least one movable wall disposed therein and a pressure control valve, the movable wall subdividing the low-pressure casing into a low-pressure chamber and a working chamber and acting upon a push rod guided in an axial direction of the brake booster. In addition to this, a reinforcement tube is provided in the low-pressure casing extending at least approximately in an axial direction connected to the end walls of the low-pressure casing, and in which reinforcement tube a control casing of the pressure control valve is slidably arranged and sealed by means of seals, with a transmission device being fastened to the movable wall and to the control casing to mechanically couple the movable wall to the control casing.

A brake booster of this type has been disclosed in the copending U.S. application of J. Belart and F. Wienecke, Ser. No. 61,113, filed July 26, 1979, assigned to the same assignee as the present application. The movable wall is arranged slidably on the reinforcement tube in this brake booster. The reinforcement tube includes at least two slots extending in a longitudinal direction and receiving slidably therein at least one cross member to mechanically couple the movable wall to the push rod. The cross member, being of U-shaped or T-shaped construction, engages in a groove disposed on the circumferential surface of the control casing or the push rod normal to the longitudinal axis and is rigidly secured to the movable wall. In this brake booster, the movable wall includes a hub extending along the entire length of the slots, with the cross member being secured to the one end of the hub, while its other end is provided with a slide seal.

Although this proposed brake booster operates basically satisfactorily, there are still problems occurring with respect to construction and operation when passing the cross members through the reinforcement tube. In particular, the method of the transmission of force between the movable wall and the control casing results in the overall length of the brake booster being comparatively large, since a seal is not possible at the slots and, thus, the length of the reinforcement tube corresponds to double the power stroke. In addition, the wall thickness required for this transmission of force is comparatively great.

SUMMARY OF THE INVENTION

It is, therefore, an object of the present invention to provide a brake booster of the type referred to hereinabove having a reduced overall length and thinner walls for the transmission of forces.

A feature of the present invention is the provision of a mechanically controlled brake booster for automotive vehicles comprising a low-pressure casing having at least one movable wall disposed therein subdividing the casing into a low-pressure chamber and a working chamber; a reinforcement tube disposed in and extending axially of the casing having one end connected to one transverse end wall of the casing adjacent said low-pressure chamber and the other end connected to the other transverse end wall of the casing adjacent the working chamber and a splashboard of the vehicles, the tube being an extension of a master brake cylinder housing; a pressure control valve disposed in a control housing, the control housing being disposed in and slidably sealed to the inner wall of the tube, the control housing abutting a master cylinder piston contained in the master cylinder housing for actuation thereof; and a transmission device fastened to the movable wall and the control housing to mechanically couple the movable wall to the control casing; the transmission device extending from the movable wall through the work chamber and the other end wall substantially parallel of the control housing.

As a result, the diameter of the reinforcement tube is permitted to be dimensioned smaller, so that the amount of pneumatic area loss becomes lower and the weight of the brake booster is reduced at the same time.

According to the present invention, the master brake cylinder, which may be a tandem master brake cylinder, is secured to the vehicle directly, and the brake device is assembled around the master brake cylinder, with the control valve casing being pushed rather than pulled by the diaphragm plate.

Since the force transmission device will extend outside the low-pressure casing in parallel to the valve casing in this arrangement, the power stroke does not have any effect on the overall length of the booster, which results in an extremely compact construction and keeps the loss volume at a comparatively low value. Since components are permitted to be used which are thinner-walled and easy to manufacture, the production of the brake booster is further lowered in price.

In a favorable embodiment of the present invention, bolts are employed as the transmission device. A particularly simple construction for the transmission of force is guaranteed with such bolts, and an even force distribution is ensured by a symmetrical arrangement of the bolts.

In another favorable embodiment of the present invention, the transmission device includes a tube which may include slots. A particularly even transmission of force is accomplished by this embodiment.

In another favorable embodiment of the present invention, a pressure plate is provided to couple the transmission device to the control casing. The pressure plate enables a particularly simple and space-saving structure for the transmission of force.

In still another embodiment of the present invention, the transmission device encloses concentrically the control casing, resulting in an extremely space-saving arrangement apart from a very even transmission of force.

For protecting the transmission device, the pressure plate and the control casing, a dust boot is provided according to an embodiment of the present invention.

Advantageously, the dust boot is constructed as a seal for the control casing neck and the transmission device, thereby obviating the need for further seals.

In further embodiments of the present invention, the connection between the housing of the master brake cylinder and the reinforcement tube is effected by flanging or directly by casting in one piece, with the latter method having proved to be a particularly simple and useful arrangement.

BRIEF DESCRIPTION OF THE DRAWING

Above-mentioned and other features and objects of this invention will become more apparent by reference to the following description taken in conjunction with the accompanying drawing, in which:

FIG. 1 is a partial cross sectional view of a brake booster and master brake cylinder in accordance with the principles of the present invention with the cross section of the bottom half thereof being taken on a different section line than the top half thereof; and FIG. 2 is a partial cross sectional view of another embodiment for fastening the master brake cylinder to the brake booster.

DESCRIPTION OF THE PREFERRED EMBODIMENT

Referring to FIG. 1, the brake booster 1 includes a low-pressure casing 2 having two casing shells 3 and 4. A reinforcement tube 5 is arranged coaxially in low-pressure casing 2. Reinforcement tube 5 is an extension of a master brake cylinder 6, and it may be cast with master brake cylinder 6 or fitted thereto by other means, as will be described below in connection with FIG. 2. Reinforcement tube 5 has on its end remote from the master brake cylinder 6 flange components 7 with tapped holes 8 for fitting to the splash wall of the vehicle.

Casing shells 3 and 4 of low-pressure casing 2 are connected to each other in position 9. Casing shells 3 and 4 can be made of plastics, with the connection being carried out suitably by a spring lock or welding. If casing shells 3 and 4 are made of thin aluminum or steel sheet, the connection is suitably provided by flanging or lancing.

Located on the inside of low-pressure casing 2 is a movable wall 10 comprising a diaphragm plate 11 and a rolling diaphragm 12. Movable wall 10 is sealed relative to low-pressure casing 2 and reinforcement tube 5. For this purpose, the outer edge of rolling diaphragm 12 is clamped at the outer periphery of low-pressure casing 2 in position 9, and the inner edge is clamped on reinforcement tube 5 in position 13. Low-pressure casing 2 is subdivided into a working chamber 14 and a low-pressure chamber 15 by means of movable wall 10.

Slidably arranged in reinforcement tube 5 is a control casing 16 of a pressure control valve 17, with control casing 16 being sealed relative to reinforcement tube 5 by means of slide seals 18 and 19. On the side remote from master brake cylinder 6, control casing 16 extends out of reinforcement tube 5. From this side, a piston rod 20 which serves to actuate pressure control valve 17 extends into control casing 16. The other end of control casing 16 carries a push rod 21 which acts on the piston 22 of master brake cylinder 6. A return spring 24 bears, on the one hand, against housing 25 of master brake cylinder 6 and, on the other hand, against a disc 23 fastened to piston 22.

A connecting or transmission device 26 is provided to mechanically couple movable wall 10 to control casing 16. Transmission device 26 includes one or several transmission elements. Thin bolts 27, as illustrated in FIG. 1, are able to be provided as transmission elements. Bolts 27 are rigidly secured to movable wall 10, and they extend from movable wall 10 through working chamber 14 and casing shell 4. Outside low-pressure casing 2, bolts 27 extend essentially parallel to neck 28 of control casing 16. A pressure plate 29 is provided on the end of bolts 27 remote from movable wall 10. Pressure plate 29 is rigidly connected to bolts 27 and abuts the end surface of control casing 16. However, a closed or a slotted tube may likewise be provided as transmission element. Suitably, transmission device 26 encloses control casing 16 concentrically. When employing several thin rods as transmission elements, these are expediently arranged symmetrically for achieving an even transmission of force.

The sealing of transmission device 26 is effected by means of seals 30, which may be lip seals or rolling bellows, and by means of lips 31 at the rolling diaphragm 12. Transmission device 26, pressure plate 29 and control casing 16 are protected against dirt and damages by a dust boot 32.

FIG. 2 shows an embodiment of the fastening of reinforcement tube 5 to master brake cylinder housing 25. Both reinforcement tube 5 and master brake cylinder housing 25 include flanges 33 and 34 which are bolted to each other. Flanges 33 and 34 can be arranged inside or outside casing shell 3. In a very expedient manner, such flanges may also be dispensed with, and the connection may be effected directly by casting in one piece.

The operation of brake booster 1 will now be described. Working chamber 14 and low-pressure chamber 15 are subjected to the partial vacuum in the inactivated position. A partial vacuum line (not illustrated) communicates via a port 35 with low-pressure casing 2. In the inactivated position, the partial vacuum propagates from low-pressure chamber 15 via an opening 36 in reinforcement tube 5 into a chamber 37 prior to control casing 16, afterwards via the valve device in control casing 16 into an annular chamber 38 prior to an outside air passage 39 and finally via a connecting channel 40 and a second opening 41 in reinforcement tube 5 into a working chamber 14. Upon actuation of piston rod 20 which is connected to a brake pedal (not shown) of the vehicle, poppet valve 43 will be closed. In the further course of the movement, valve piston 42 lifts from poppet valve 43, the outside air passage 39 being opened thereby. This clears the way for the atmospheric air to pass through control casing 16 to working chamber 14 resulting in the partial vacuum being eliminated. A differential of pressure is caused between working chamber 14 and low-pressure chamber 15. The force resulting from this differential of pressure displaces movable wall 10 in the direction of master brake cylinder 6. This movement of movable wall 10 will be transmitted via transmission device 26, i.e., via bolts 27 and pressure plate 29 to control casing 16, thereby assisting the driver's pedal force. In this course of events, push rod 21 is moved in the direction of master brake cylinder 6, and a hydraulic pressure is built up in master cylinder 6 by piston 22 in a known manner. The wheel brake cylinders communicate with master brake cylinder 6 via the ports 44 and 45.

Due to the construction of the brake booster in accordance with the present invention, the entire amount of actuating force is transmitted directly via reinforcement tube 5 to the vehicle. Thus, casing shells 3 and 4 are completely free from external forces and have to absorb merely the stress exerted by the application of the partial vacuum.

While I have described above the principles of my invention in connection with specific apparatus, it is to be clearly understood that this description is made only by way of example and not as a limitation to the scope of my invention as set forth in the objects thereof and in the accompanying claims.

I claim:

1. A mechanically controlled brake booster for automotive vehicles comprising:
    a low-pressure casing having at least one movable wall disposed therein subdividing said casing into a low-pressure chamber and a working chamber;
    a reinforcement tube disposed in and extending axially of said casing having one end connected to one transverse end wall of said casing adjacent said low-pressure chamber and the other end connected to the other transverse end wall of said casing adjacent said working chamber and a splash-board of said vehicles, said tube being an extension of a master brake cylinder housing;
    a pressure control valve disposed in a control housing, said control housing being disposed in and slidably sealed to the inner wall of said tube, said control housing abutting a master cylinder piston contained in said master cylinder housing for actuation thereof; and
    a transmission device fastened to said movable wall and said control housing to mechanically couple said movable wall to said control casing; said transmission device extending from said movable wall through said work chamber and said other end wall substantially parallel of said control housing.

2. A brake booster according to claim 1, wherein said transmission device includes at least one bolt.

3. A brake booster according to claim 2, wherein said transmission device is connected to said control housing by a pressure plate.

4. A brake booster according to claim 3, wherein said transmission device and said control housing are disposed concentrically with respect to each other.

5. A brake booster according to claim 4, wherein said transmission device is sealed to said movable wall.

6. A brake booster according to claim 5, wherein said transmission device is slidably sealed to said other end wall.

7. A brake booster according to claim 6, further including a dust boot to enclose said transmission device.

8. A brake booster according to claim 7, wherein said dust boot provides a seal between said transmission device and said control housing.

9. A brake booster according to claims 1, 2, 3, 4, 5, 6, 7 or 8, wherein
    said master cylinder housing and said tube are an integral unit.

10. A brake booster according to claims 1, 2, 3, 4, 5, 6, 7 or 8, wherein
    said master cylinder housing includes a first flange adjacent said tube having at least a first aperture therein, and
    said tube includes a second flange adjacent said master cylinder housing having at least a second aperture therein aligned with said first aperture, said first and second apertures having a bolt disposed therein to connect said master cylinder housing to said tube.

11. A brake booster according to claims 1, 2, 3, 4 or 5, further including
    a dust boot to enclose said transmission device.

12. A brake booster according to claims 1, 2, 3 or 4, wherein
    said transmission device is slidably sealed to said other end wall.

13. A brake booster according to claims 1, 2 or 3, wherein
    said transmission device is sealed to said movable wall.

14. A brake booster according to claims 1 or 2, wherein
    said transmission device and said control housing are disposed concentrically with respect to each other.

15. A brake booster according to claim 1, wherein said transmission device is connected to said control housing by a pressure plate.

* * * * *